Sept. 17, 1940.     F. T. HARRINGTON     2,214,816
POWER TRANSMISSION
Filed Oct. 2, 1937     2 Sheets-Sheet 1
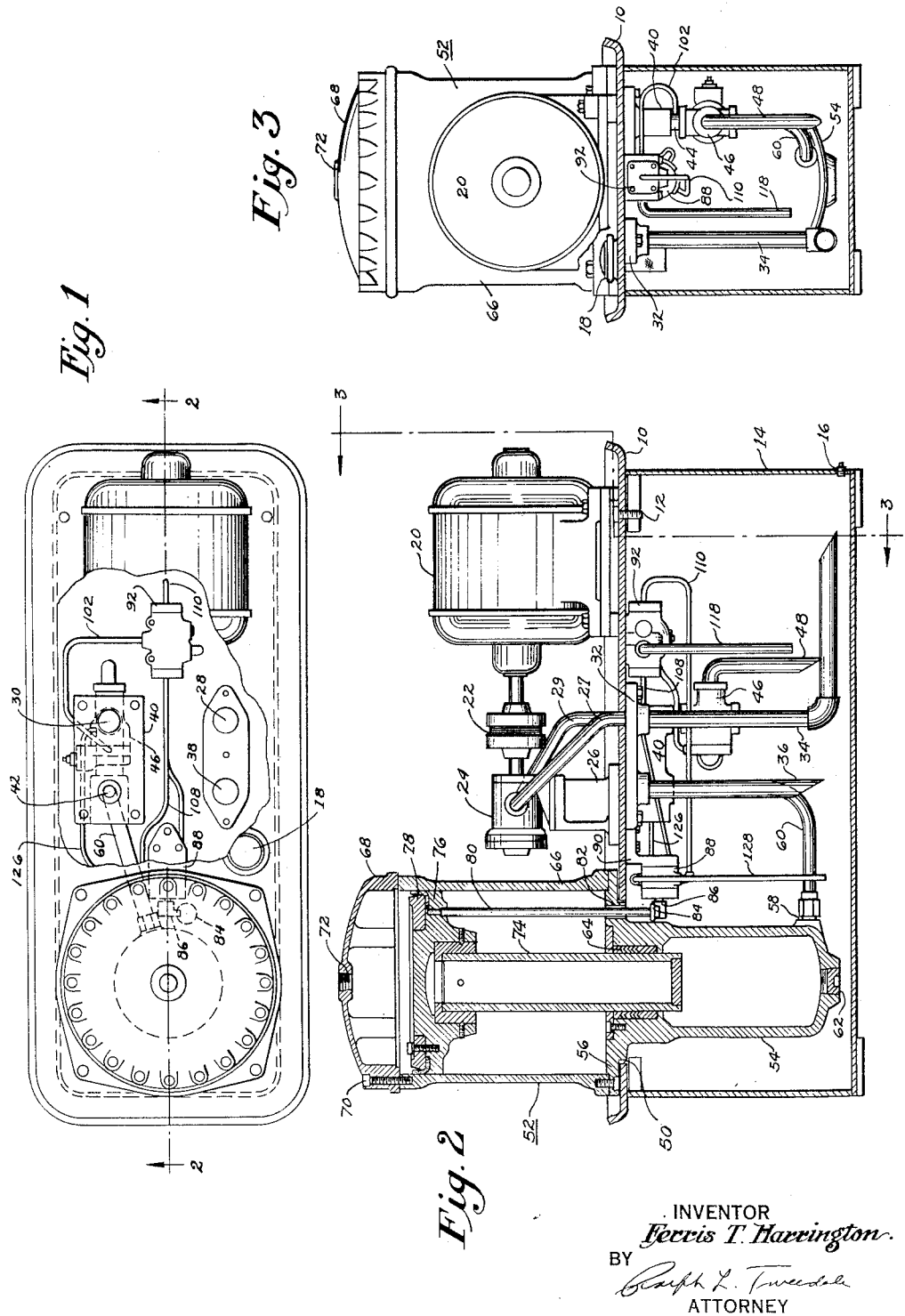
INVENTOR
*Ferris T. Harrington*
BY
*Ralph L. Tweedale*
ATTORNEY Sept. 17, 1940.   F. T. HARRINGTON   2,214,816
POWER TRANSMISSION
Filed Oct. 2, 1937   2 Sheets-Sheet 2
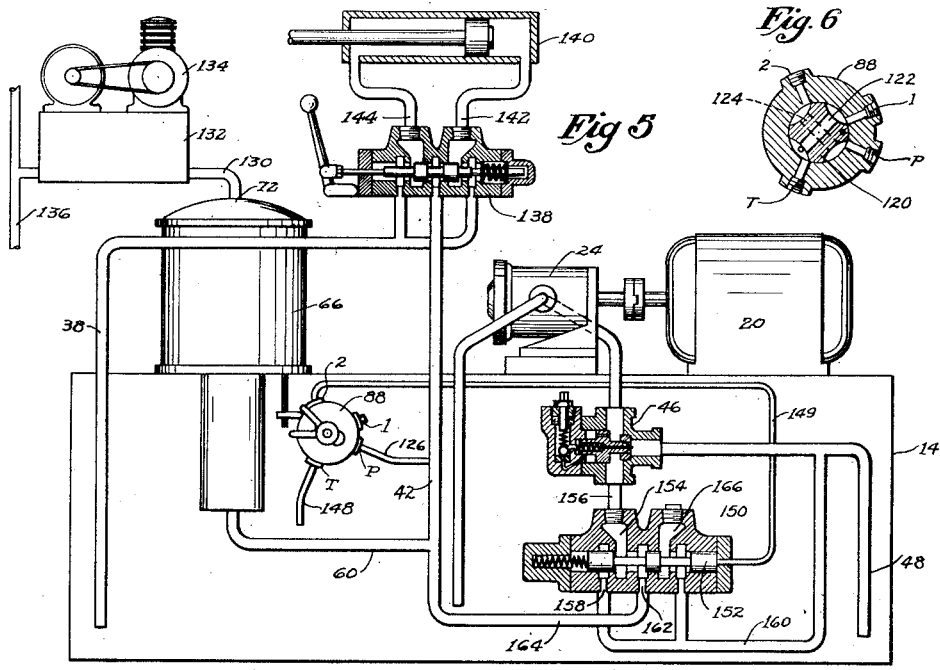
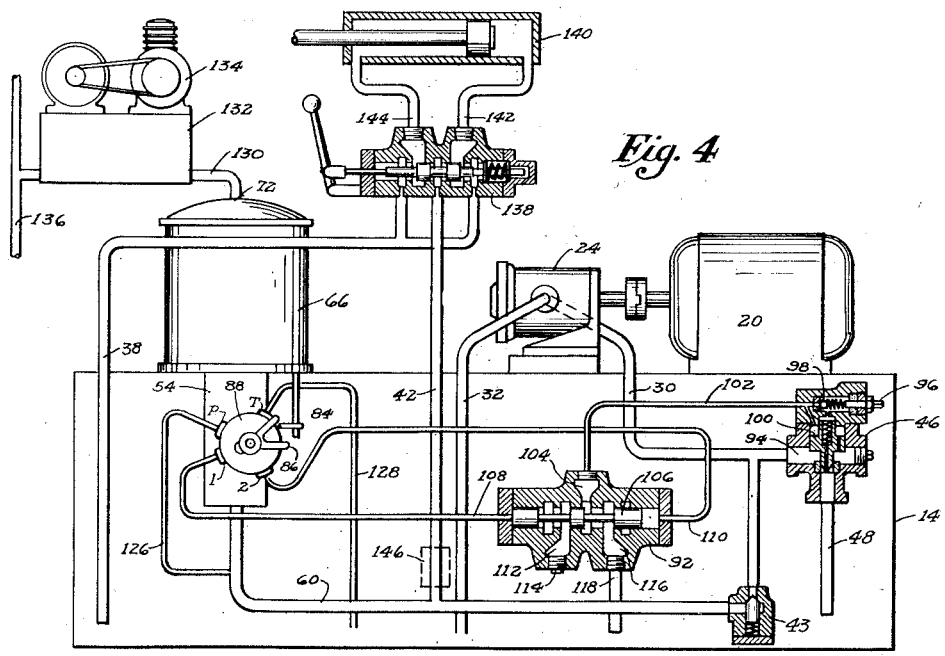
INVENTOR
*Ferris T. Harrington*
BY *Ralph L. Tweedale*
ATTORNEY Patented Sept. 17, 1940

2,214,816

UNITED STATES PATENT OFFICE 2,214,816

POWER TRANSMISSION

Ferris T. Harrington, Detroit, Mich., assignor to Vickers Incorporated, Detroit, Mich., a corporation of Michigan Application October 2, 1937, Serial No. 166,971

14 Claims. (Cl. 103—42)

This invention relates to power transmissions and more particularly to those of the type comprising two or more fluid pressure energy translating devices, one of which may function as a pump and another as a fluid motor. The invention is particularly concerned with a pressure fluid supply unit for use in power transmissions of this character. In many applications of fluid transmission systems the fluid requirements fluctuate widely through different portions of a cycle of operation and it has been customary in the past to provide a pump which is capable of supplying fluid at a rate less than the peak rate of consumption of the motor device or devices connected in the circuit and utilize an accumulator floating on the line at the delivery side of the pump for storing fluid under pressure during periods of low rates of fluid consumption and for supplying fluid in addition to that supplied by the pump during periods when the requirements are greatest.

It is an object of the present invention to provide a compact unitary device which incorporates a prime mover, a pump, an accumulator and all the necessary valves for satisfactory operation as a source of pressure fluid for any hydraulic power transmission circuit which has a fluctuating rate of fluid consumption.

A further object is to provide an improved method and means for operating a pump and accumulator combination in a manner to relieve the power load on the prime mover whenever the accumulator is filled with fluid.

A further object is to provide a pump and accumulator system wherein the accumulator may be operated by compressed air from an ordinary air compressor and storage tank, such as is usually found in many industrial establishments and wherein fluctuations in air pressure will not be reflected in the pressure supplied to the motor devices in circuit with the accumulator.

Further objects and advantages of the present invention will appear from the following specification and description of a preferred embodiment thereof which is illustrated in the accompanying drawings, wherein:

In the drawings:

Fig. 1 is a top view partly broken away of a combined pump and accumulator unit incorporating a preferred form of the present invention.

Fig. 2 is a cross section on line 2—2 of Fig. 1.

Fig. 3 is a cross section on line 3—3 of Fig. 2.

Fig. 4 is a diagrammatic view showing the hydraulic circuits incorporated in the mechanism of Fig. 1.

Fig. 5 is a diagrammatic view of an alternative hydraulic circuit which may be incorporated in a device similar to that of Fig. 1.

Fig. 6 is a cross section of a pilot valve incorporated in the circuits of Figs. 4 and 5.

Referring now to Figs. 1 to 3, there is illustrated a combined pump and accumulator unit comprising a main plate 10 which forms a mounting base for the individual units incorporated in the device. The plate may have an upturned rim as illustrated for the purpose of catching oil or other substances leaking from the units mounted above the plate 10. Secured to the underside of plate 10 by bolts 12 is a rectangular tank 14 which is fluid tight and is adapted to form a sump as well as to form a support for the plate 10. A drain plug may be provided at 16 for draining the fluid from the tank 14 and a filler hole closed by a cap 18 may be provided in the plate 10 for filling the tank 14 with a power transmission fluid, usually oil, and referred to as such hereafter.

Secured to the top side of plate 10 is an electric motor 20 which is direct connected by a coupling 22 to a pump 24. The latter may be of any suitable construction such as the well-known vane, gear, or piston type and is preferably, but not necessarily, of fixed displacement. The pump 24 is mounted on the plate 10 by means of a bracket 26 and has suction and delivery conduits 27 and 29 which connect with holes 28 and 30, respectively, formed in the base plate 10. The suction conduit 27 is formed in a dual flange member 32 secured to the under side or plate 10 and having pipes 34 and 36 secured to its lower side. The latter communicates with an opening 38 extending through the plate 10 and forming a return connection for the hydraulic circuit which is connected to the fluid supply unit. The delivery conduit 30 is formed in a block 40 secured to the underside of the plate 10. The block 40 has an additional conduit 42 formed therein at its left-hand end in Fig. 1 which is adapted to form the supply connection to the motor circuit connected to the fluid supply device. The block 40 includes a check valve 43 (see Fig. 4) connecting the conduits 29 and 42 and opening in the direction of flow from conduit 29 to 42. Secured to the block 40 by a short nipple 44 is a relief valve 46 having a discharge pipe 48 secured thereto.

Mounted in an aperture 50 in the plate 10 is an air operated accumulator generally designated at 52. The accumulator comprises an oil cylinder 54 extending into the tank 14 and having a flange 56 at its upper end by which the oil cylinder is attached to the plate 10. The cylinder 54 is provided with an oil connection at 58 which connects by a pipe 60 with the supply conduit 42 in the block 40. A plugged opening 62 may also be provided for draining oil from the cylinder 54 when necessary. The top end of the cylinder 54 is provided with a piston opening in which is incorporated a chevron packing 64. Secured to the flange 56 is an air cylinder 66 closed by a cap 68 which is secured thereto by bolts 70. The cap 68 is provided with an air inlet connection at 72. Slidably mounted within the cylinders 54 and 66 is a differential piston having a small diameter oil piston 74 and a large diameter air piston 76. The latter is provided with a cup packing at 78. Secured to the piston 76 is a rod 80 extending through a hole 82 formed in the flange 56. At the lower end of the rod 82 there is provided a lug 84 which operates a trip lever 86 secured to the operating stem of a rotary four-way pilot valve 88. The latter is secured to the plate 10 by a bracket 90. Also secured to the plate 10 is a pilot operated three-way valve 92.

Referring now to Fig. 4 the internal construction of the valves and the hydraulic connections therebetween are there illustrated in detail. The relief valve 46 is of the pilot operated type and may be constructed similarly to that illustrated in the patent to Harry F. Vickers 2,043,453. Briefly, such a valve is adapted to open automatically when a predetermined pressure is reached in the high pressure conduit 94 and to dump fluid to the discharge conduit 48. The pressure at which the valve opens may be regulated by an adjusting screw 96 which controls the loading of a pilot valve 98. The valve 46 may also be operated as a dumping valve independently of the pressure in conduit 94 by venting the space above the large piston 100 through a conduit 102. Conduit 102 communicates with a port 104 in the three-way valve 92. The latter includes a spool 106 adapted to be shifted to the right or left when pressure fluid is admitted to a conduit 108 or 110. When the spool is shifted to the right the port 104 is connected to a port 112 which is blocked by a plug 114. When the spool is shifted to the left as shown in Fig. 4, port 104 is connected to a port 116 which opens to the tank through a pipe 118.

The construction of the pilot valve 88 is illustrated in Fig. 6 from which it will be seen that the valve body is provided with four radial ports, T, P 1, and 2, spaced in multiples of forty-five degrees around the circumference of the body. The valve plug 120 is provided with four equally spaced arcuate cutouts, opposite ones of which are connected by non-communicating cross bores 122 and 124. In the position illustrated, it will be seen that the port P is connected to the port 2 through cross bore 124; while the port T is connected to the port 1 through cross bore 122. If the valve plug is turned forty-five degrees in either direction the connections are reversed. The port 1 is connected to the left-hand operating cylinder by conduit 108 while the port 2 is connected to the right-hand cylinder by conduit 110. Port P is connected to the conduit 60 by a branch conduit 126 while the port T dumps to the tank by a pipe 128.

The port 72 of the air cylinder 66 communicates by a conduit 130 with any convenient supply of compressed air which is represented as a tank 132 provided with a motor driven compressor 134. The former may be connected to a supply line 136 to which other air operated devices of any nature may be connected; suitable means, not illustrated, being supplied for controlling the operation of the compressor in response to pressure conditions in the tank 132. Any hydraulic circuit including one or more hydraulic motors may be connected to the supply and return conduits 42 and 38. In Fig. 4 such a circuit is illustrated diagrammatically as including a four-way reverse valve 138 and a reciprocating piston type of fluid motor 140. The valve 138 is adapted to control communication between conduits 142 and 144 leading to opposite ends of the motor cylinder 140 for controlling the rate and direction of movement of the motor piston.

In operation the motor 20 is started causing the pump 24 to draw fluid from the tank 14 through suction conduit 32 and to deliver the same to the discharge conduit 30. Assuming the oil cylinder 54 to be empty and the piston 74 to have descended to the end of its stroke, the pilot valve 88 will have been rotated clockwise from the position shown in Fig. 4. The port P will thus be connected to port 1 and port T connected to port 2. Fluid passing the check valve 43 will thus be admitted through conduits 60 and 126, ports P and 1, and conduit 108 to the left-hand operating cylinder of valve 92. The spool 106 will accordingly shift to the right and discharge fluid through conduit 110, ports 2 and T, and pipe 128 to the tank 14. The relief valve vent passage 102 will thus have been closed before the accumulator piston reached the end of its downward stroke at the time the unit was previously shut down. Pressure is accordingly built up in the discharge conduit 29 and fluid is supplied to the oil cylinder 54 through the check valve 43 and conduit 60, causing the piston therein to rise and forcing air out of the air cylinder 66 through the conduit 130. It will be understood of course that the tank 132 normally contains many times the volume displaced from the air cylinder 66 so that the air pressure in the tank 132 and cylinder 66 does not rise significantly while the accumulator piston ascends. As the accumulator piston nears the top of its stroke, the lug 84 operates the trip lever 86 to shift valve 88 counterclockwise in Fig. 4 and reverse the connections to conduits 108 and 110, thus shifting spool 106 to the left and opening vent conduit 102 to the vent port 116. The relief valve 46 accordingly opens permitting the pump to discharge oil through the pipe 48 to the tank and thus unloading the motor 20. Check valve 43 maintains pressure in the conduits 42 and 60 under these conditions.

If now, the valve 138 be shifted from its central position to cause operation of the motor 140, the oil cylinder 54 will supply fluid through conduits 60 and 42 to the motor 140. In so doing the piston 74 will descend operating the pilot valve 88 to cause the spool 106 to shift to the right again blocking the relief valve conduit 102. Under these conditions the pump again delivers fluid through check valve 43 and, in addition, the accumulator cylinder 54 may also supply fluid to augment that delivered by the pump. Thereafter as soon as the rate of consumption of oil at the motor 140 falls below the delivery capacity of the pump 24, the cylinder 54 will again start to fill and the pump 24 will remain in operation regardless of the operation of motor 140 until cylinder 54 is completely filled. It will be noted that the pilot valve 88 is effective to close the vent passage of relief valve 46 as the accumulator piston begins its descent and causes the same to remain closed at all times when the cylinder 54 is not substantially filled. Thus, there is at all times available not only the full capacity of the pump 24 but also the full capacity of the oil cylinder 54 for supplying fluid to the motor 140 during operation at a peak oil consumption rate. The lug 84 is preferably vertically adjustable on the rod 80, however, since in some installations it is desirable to provide for varying the accumulator capacity.

Should the source of compressed air 132—134 and the devices connected to the line 36 be such that the pressure in tank 132 is subject to significant fluctuations, the system may be made to supply a constant pressure to the valve 138 by incorporating a conventional pressure regulating valve in the conduit 42 as shown by dotted lines at 146. This valve may be of the type which regulates the flow therethrough in a manner to maintain a constant pressure on the discharge side of the valve. In case such a valve is incorporated, the relief valve 46 will be adjusted to open when the oil pressure is slightly in excess of that corresponding to the maximum ever developed in the tank 132, while the regulating valve 146 may be set to provide a discharge pressure slightly lower than that corresponding to the minimum pressure existing in the tank 132. Thus, the air cylinder 66 remains constantly open to the tank 132 so that the benefit of the large volume of air therein may still be obtained while the regulating valve 146 operates to prevent fluctuations in air pressure from appearing as fluctuations in oil pressure in the supply conduit 42.

Referring now to Fig. 5, there is illustrated a modified hydraulic circuit which may be used in lieu of that illustrated in Fig. 4. The only difference between the circuit of Fig. 5 and that of Fig. 4 is that the relief valve 46 is operated only as a relief valve and not as a dumping valve in response to conditions in the accumulator. For the purpose of by-passing the pump when the accumulator is filled, the pilot valve 88 has its port P connected to supply conduit 42 and its port T dumping to the tank through a pipe 148. The port 2 is connected by a conduit 149 to the operating cylinder of a spring-loaded three-way valve 150 so that whenever the oil cylinder is filled, pressure is admitted from conduit 42 through ports P and 2 and conduit 149 to shift the spool 152 to the left. Port 1 of valve 88 is plugged. The valve 150 has a port 154 connected to the pressure side of the relief valve 46 by a conduit 156. With the valve spool 152 shifted to the left, port 154 is connected to a port 158 which leads to the tank through a conduit 160. When the accumulator piston starts to descend the pilot valve 88 is shifted to connect port 2 with port T thus permitting the spring to shift spool 152 to the right, dumping oil from the conduit 149 to the tank. In this position of the spool 152, port 154 is connected to a port 162 which is connected by a conduit 164 with the supply conduit 42. It will be noted that in the left-hand position of the spool 152, port 162 is blocked by its connection to a plugged port 166, thus performing the function of check valve 43.

While the form of the invention shown and described represents a preferred embodiment thereof, it will be understood that the invention may be embodied in various forms as determined by the scope of the claims which follow.

What is claimed is as follows:

1. In a fluid power transmission system a pressure fluid supply unit comprising a closed casing forming an oil sump, a cover plate forming the top of said casing, an accumulator formed in said casing including a vertically positioned oil cylinder below the cover and an air cylinder of larger diameter mounted on top of the cover and a differential piston reciprocable in said cylinders, said air cylinder having connection to a source of air under pressure, a fixed displacement pump and an electric motor for driving the same mounted on top of said cover, valve means mounted on the cover and responsive to motion of the accumulator piston selectively either to connect the discharge side of the pump to the oil cylinder or to by-pass the pump discharge to the sump while maintaining the oil cylinder cut off from the sump, and an oil outlet line leading from the oil cylinder and an oil return line leading to the sump, said cover being removably secured to the sump and forming a support for all parts of the mechanism in operative relation whereby assembly inspection and adjustment is facilitated.

2. In a fluid power transmission system a pressure fluid supply unit comprising a closed casing forming an oil sump, a cover plate forming the top of said casing, an accumulator formed in said casing including a vertically positioned oil cylinder and an air cylinder of larger diameter and a differential piston reciprocable in said cylinders, said air cylinder having connection to a source of air under pressure, a fixed displacement pump and an electric motor for driving the same mounted on said casing, valve means including a pilot operated three-way valve normally biased to one position and a pilot valve responsive to motion of the accumulator piston for causing the three-way valve selectively either to connect the discharge side of the pump to the oil cylinder or to by-pass the pump discharge to the sump while maintaining the oil cylinder cut off from the sump, and an oil outlet line leading from the oil cylinder and an oil return line leading to the sump.

3. In a fluid power transmission system a pressure fluid supply unit comprising a closed casing forming an oil sump, an accumulator including an oil cylinder and a resiliently loaded piston mounted on said cover with the oil cylinder extending below the cover, a fixed displacement pump and an electric motor for driving the same mounted on top of said cover, and means mounted on said cover and controlled by movement of said piston for initiating delivery of oil from said pump whenever the oil cylinder is not substantially filled and for relieving the load on the electric motor when the oil cylinder is substantially filled, said cover being removably secured to the sump and forming a support for all parts of the mechanism in operative relation whereby assembly inspection and adjustment is facilitated.

4. In a fluid power transmission system the combination of a fixed displacement pump, means for continuously driving the pump, an accumulator including an oil cylinder and a resiliently biased piston therein, a pilot valve operated by said piston, a three-way valve for selectively connecting the pump discharge either to the accumulator or to the suction side of the system, said three-way valve being normally biased to connect the pump to the accumulator and means controlled by the pilot valve for overcoming said bias when the oil cylinder is substantially filled.

5. In a fluid power transmission system the combination of a fixed displacement pump, means for continuously driving the pump, an accumulator including an oil cylinder and a resiliently biased piston therein, a pilot valve operated by said piston, a three-way valve for selectively connecting the pump discharge either to the accumulator or to the suction side of the system, said three-way valve being normally biased to connect the pump to the accumulator and means controlled by the pilot valve for overcoming said bias by fluid supplied from the accumulator when the oil cylinder is substantially filled.

6. In a fluid power transmission system the combination of a fixed displacement pump, means for continuously driving the pump, an accumulator including an oil cylinder and a resiliently biased piston therein, a pilot valve operated by said piston, a three-way valve for selectively connecting the pump discharge either to the accumulator or to the suction side of the system, said three-way valve being normally biased to connect the pump to the accumulator and means controlled by the pilot wave for overcoming said bias when the oil cylinder is substantially filled, said three-way valve acting to prevent back flow from the oil cylinder when the pump is by-passed.

7. In a fluid power transmission system the combination of a fixed displacement pump, means for continuously driving the pump, an accumulator including an oil cylinder and a resiliently biased piston therein, a pilot valve operated by said piston, a three-way valve for selectively connecting the pump discharge either to the accumulator or to the suction side of the system, and means controlled by the pilot valve for operating the three-way valve to connect the pump discharge to the suction side of the system when the oil cylinder is substantially filled.

8. In a fluid power transmission system the combination of a fixed displacement pump, means for continuously driving the pump, an accumulator including an oil cylinder and a resiliently biased piston therein, a pilot valve operated by said piston, a valve for by-passing the pump discharge and means controlled by the pilot valve for opening said by-pass valve when the oil cylinder is substantially filled, said by-pass valve being further responsive to the pump discharge pressure for opening the valve whenever a predetermined pressure is exceeded.

9. In a fluid power transmission system the combination of a fixed displacement pump, means for continuously driving the pump, an accumulator including an oil cylinder and a resiliently biased piston therein, a pilot valve operated by said piston, a valve for by-passing the pump discharge and means controlled by the pilot valve for opening said by-pass valve when the oil cylinder is substantially filled, said by-pass valve acting to cut off the flow of oil back from the accumulator when the pump is by-passed.

10. In a fluid power transmission system a pressure fluid supply unit comprising a closed casing forming an oil sump, a cover plate forming the top of said casing, an accumulator mounted on said casing including a vertically positioned oil cylinder below the cover and an air cylinder of larger diameter mounted on top of the cover and a differential piston reciprocable in said cylinders, said air cylinder having connection to a source of air under pressure, a fixed displacement pump and an electric motor for driving the same mounted on top of said cover, valve means mounted on the cover and responsive to motion of the accumulator piston selectively either to connect the discharge side of the pump to the oil cylinder or to by-pass the pump discharge to the sump while maintaining the oil cylinder cut off from the sump, an oil outlet line leading from the oil cylinder and an oil return line leading to the sump, said cover being removably secured to the sump and forming a support for all parts of the mechanism in operative relation whereby assembly inspection and adjustment is facilitated, and packing means for both ends of the differential piston and arranged to be accessible for replacement upon removal of only the air cylinder from the cover.

11. In a fluid power transmission system a pressure fluid supply unit comprising a closed casing forming an oil sump, a cover plate forming the top of said casing, an accumulator including a vertically positioned oil cylinder and a resiliently loaded piston mounted on said cover with the oil cylinder extending below the cover, a fixed displacement pump and an electric motor for driving the same mounted on top of said cover, and means mounted on said cover and controlled by movement of said piston for initiating delivery of oil from said pump whenever the oil cylinder is not substantially filled and for relieving the load on the electric motor when the oil cylinder is substantially filled, said means including a pilot-operated relief valve for selectively bypassing the pump and a pilot valve controlled by the accumulator piston for operating the relief valve, said cover being removably secured to the sump and forming a support for all parts of the mechanism in operative relation whereby assembly inspection and adjustment is facilitated.

12. In a fluid power transmission system a pressure fluid supply unit comprising a closed casing forming an oil sump, a cover plate forming the top of said casing, an accumulator including a vertically positioned oil cylinder and a resiliently loaded piston mounted on said cover with the oil cylinder extending below the cover, a fixed displacement pump and an electric motor for driving the same mounted on top of said cover, and means mounted on said cover for initiating delivery of oil from said pump whenever the oil cylinder is not substantially filled and for relieving the load on the electric motor when the oil cylinder is substantially filled, said means including a relief valve for selectively bypassing the pump and having a normally balanced piston for maintaining the bypass closed, a fluid-operated valve for selectively unbalancing said piston to open the relief valve, and a pilot valve responsive to conditions at the accumulator for controlling said fluid-operated valve, said cover being removably secured to the sump and forming a support for all parts of the mechanism in operative relation whereby assembly inspection and adjustment is facilitated.

13. In a fluid power transmission system a pressure fluid supply unit comprising a closed casing forming an oil sump, a cover plate forming the top of said casing, an accumulator mounted on said casing including an oil cylinder and an air cylinder of larger diameter and mounted on the cover and a differential piston reciprocable in said cylinders, said air cylinder having connection to a source of air under pressure, a fixed displacement pump and an electric motor for driving the same mounted on top of said cover, valve means responsive to motion of the accumulator piston selectively either to connect the discharge side of the pump to the oil cylinder or to bypass the pump discharge to the sump while maintaining the oil cylinder cut off from the sump, an oil outlet line leading from the oil cylinder and an oil return line leading to the sump, and packing means for both ends of the differential piston and arranged to be accessible for replacement upon removal of only the air cylinder from the cover.

14. In a fluid power transmission system the combination of a fixed displacement pump, means for continuously driving the pump, an accumulator for storing varying amounts of liquid under pressure, a pilot control means responsive to changes in the amount of liquid in the accumulator, a valve for bypassing the pump discharge and operating means controlled by the pilot control means for opening said bypass valve when the accumulator is substantially filled, said bypass valve being further responsive to the pump discharge pressure for opening the valve whenever a predetermined pressure is exceeded.

FERRIS T. HARRINGTON.

CERTIFICATE OF CORRECTION.

Patent No. 2,214,816.  September 17, 1940.

FERRIS T. HARRINGTON.

It is hereby certified that error appears in the printed specification of the above numbered patent requiring correction as follows: Page 1, second column, line 36, for "or" read --of--; page 3, second column, lines 28 and 29, claim 2, strike out "a cover plate forming the top of said casing," and insert the same after "sump," in line 49, claim 3; line 30, claim 2, for "a vertically positioned" read --an--; line 50, claim 3, for "an" read --a vertically positioned--; page 4, first column, line 25, claim 6, for the word "wave" read --valve--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.